United States Patent [19]

Kampfmann

[11] 4,449,883

[45] May 22, 1984

[54] CONTACT POSITIONING APPARATUS

[75] Inventor: Georg Kampfmann, Darmstadt-Eberstadt, Fed. Rep. of Germany

[73] Assignee: AMP Incorporated, Harrisburg, Pa.

[21] Appl. No.: 360,141

[22] Filed: Mar. 22, 1982

[30] Foreign Application Priority Data

Mar. 24, 1981 [GB] United Kingdom ................ 8109205

[51] Int. Cl.³ ............................................ B65G 47/26

[52] U.S. Cl. ................................ 414/744 A; 414/60; 414/225; 414/736; 198/456

[58] Field of Search ................ 414/60, 736, 749, 225, 414/744 A, 751; 198/456, 458

[56] References Cited

U.S. PATENT DOCUMENTS 3,506,140 4/1970 Koch et al. ........................ 414/736

3,570,649 3/1971 Fluck ................................. 198/458

4,199,288 4/1980 Ganz et al. .................... 414/736 X

FOREIGN PATENT DOCUMENTS 960642 1/1965 United Kingdom ................ 198/458

*Primary Examiner*—Leslie J. Paperner

*Assistant Examiner*—Terrance L. Siemens

*Attorney, Agent, or Firm*—F. W. Raring

[57] ABSTRACT

The contact positioning apparatus comprises a plurality of contact holding portions (11, 11') adapted to receive a series of contacts at a first pitch and to deliver the contacts to a second, different pitch. The portions (11, 11') are arranged in spaced parallel coplanar relation and are supported from a carriage (19) on respective cranks (13, 14) individually rotatable by respective pinions (16, 16'). Arms (13, 13') of the cranks are of progressively increased length and elements (55, 23) provide for bringing the pinions (16, 16') into engagement with a common rack (27), traversable to rotate the cranks and bring the contact holding portions to the desired different pitch. The carriage is suitably supported on an XYZ positioning mechanism to move the contacts between receiving and discharge stations.

3 Claims, 5 Drawing Figures

CONTACT POSITIONING APPARATUS

The invention relates to contact positioning apparatus.

For the purpose of mass production at low cost, there is a need for apparatus which is capable of terminating wires in respective contacts and subsequently inserting the contacts into respective cavities in insulation housings with minimal attention by an operator.

Frequently, contacts fed automatically in strip form to a terminating apparatus must be inserted in loose piece form (terminating individual wires) into the housing. When the pitch of the contacts on the strip differs from the pitch of the housing cavities handling difficulties arise unless the contacts are inserted successively into the housing cavities which is a relatively slow process.

According to the invention, contact positioning apparatus adapted to receive a series of contacts arranged at a first pitch and to deliver the contacts arranged at a second pitch different from the first pitch includes a plurality of contact holding portions mounted for rotation on different radii from a contact receiving position in which they are spaced at the first pitch to a contact delivering position in which they are spaced at the second pitch.

More specifically, successive contact holding portions are mounted aligned in coplanar relation in the contact receiving position on respective ends of parallel arms of progressively increasing length, other ends of the arms being mounted for rotation about parallel axis perpendicular to the arms, the arms being arranged in staggered relation in the axial direction. The other ends of the arms may be mounted on respective pinions, spaced by successively decreasing distances from a rack when in the contact receiving position, means being provided subsequently to bring all the pinions into engagement with the rack then operable to effect the rotation of all the arms simultaneously.

An example of apparatus according to the invention will now be described with reference to the accompanying drawings in which.

Figure 1:
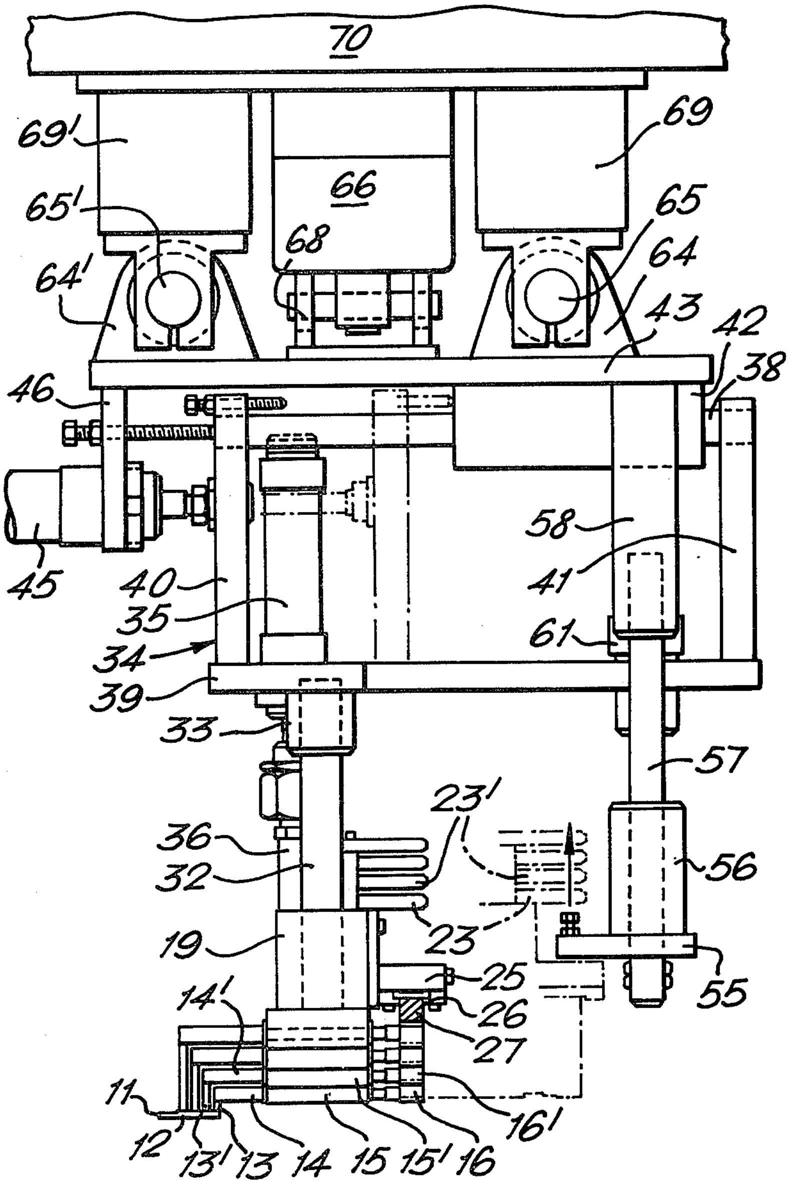
FIG. 1 is a side elevation of contact positioning apparatus according to the invention.
Figure 2:
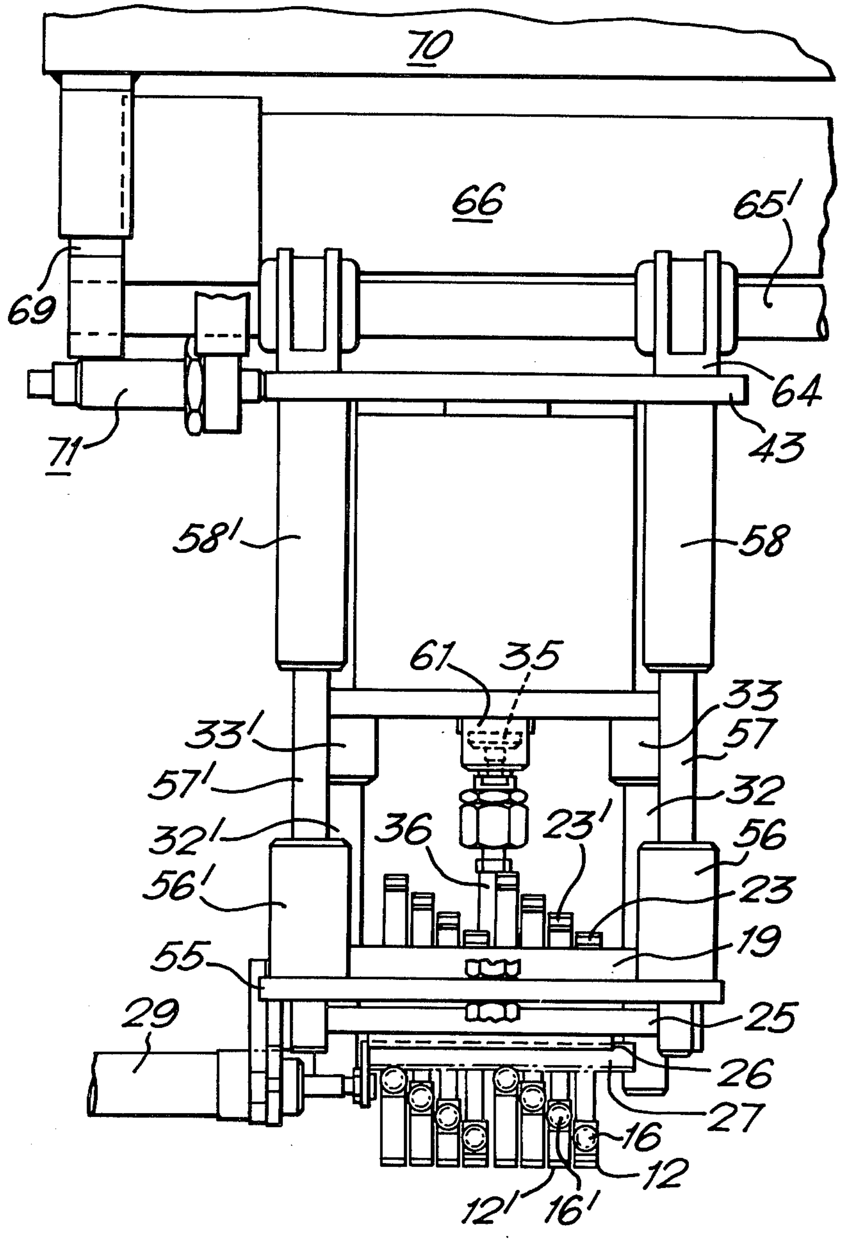
FIG. 2 is a rear elevation of the apparatus of FIG. 1 with parts broken away for clarity.
Figure 3:
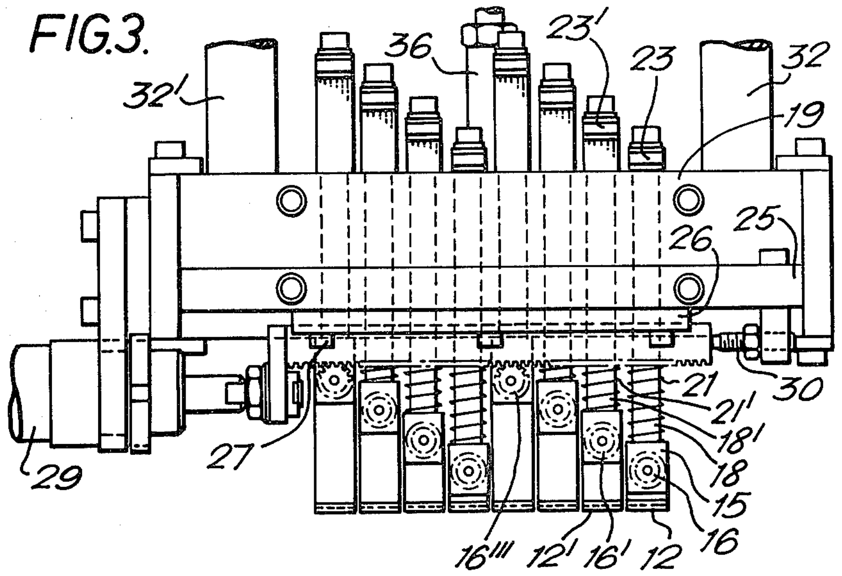
FIG. 3 is a rear elevation of part of the apparatus of FIG. 1 prior to contact positioning.
Figure 4:
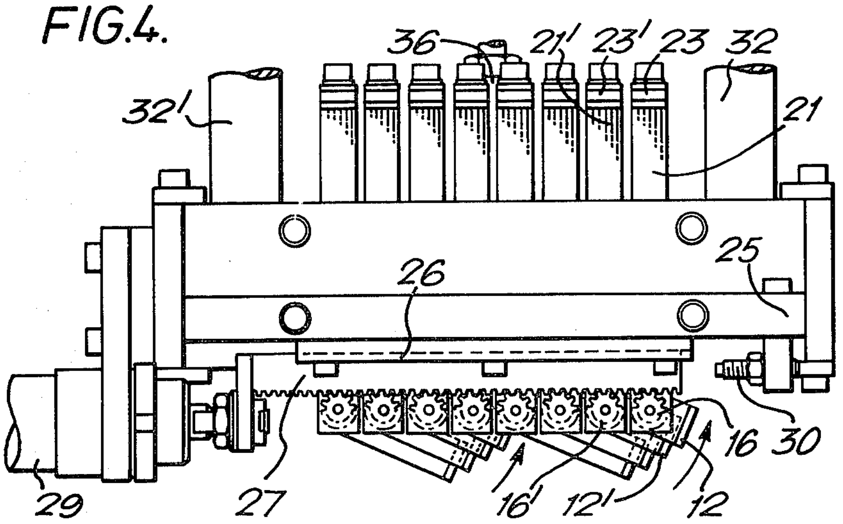
FIG. 4 is a similar view to FIG. 3 after contact positioning.

As shown particularly in FIG. 1, the contact positioning apparatus includes a row of contact engaging fingers 11, 11' etc arranged in coplanar relation in two groups of four. Each finger 11 or 11' extends forwardly from a respective plate 12 or 12' mounted on an end of a crank, having vertical and horizontal limbs 13 and 14, and 13' and 14', respectively. Each horizontal limb is mounted for axial rotation in a sleeve 15 or 15' and carries a pinion 16 or 16' at its other end. The crank limbs 13 and 14, and 13' and 14', associated with successive fingers 11, 11' within each group are of progressively increasing length so that the cranks are staggered or offset from the other cranks of the group in both the horizontal and vertical directions. The sleeves 15, 15' are mounted on respective lower ends of rods 18, 18' (FIG. 3) mounted for vertical sliding movement against biassing springs 21, 21' in a carriage housing 19. Lugs 23, 23' extend rearwardly in flag fashion from the respective other ends of the rods 18, 18'. As the rods are all of substantially the same length, the lugs 23, 23' associated with each group are mutually staggered in the vertical plane.

As shown in FIGS. 1 to 4, a block 25 mounted on the rear face of the carriage housing carries a horizontal track 26 receiving a rack 27 vertically aligned with the pinions 16, 16' and reciprocable horizontally relative to the pinions by a piston-and-cylinder 29 mounted at one end of the carriage housing. An adjustable stop 30 is mounted at the other end of the carriage housing to limit the traverse of the rack.

The carriage housing 19 is suspended from an upper cross-member 70 by an X, Y, Z movement mechanism for movement of the housing 19 between a contact support of wire terminating apparatus, described below in connection with FIG. 5, and a contact insertion station, not shown, at which contacts are inserted into connector housings.

The carriage housing 19 is mounted for vertical movement on vertical guides 32, 32' received as a sliding fit in respective sleeves 33, 33' on a carriage housing suspension unit 34, piston-and-cylinder 35 also carried by suspension unit 34 and connected to the carriage housing 19 being operable to raise and lower the carriage housing 19 between the positions shown in full and broken lines in FIG. 1. The suspension unit 34 comprises a box frame having upper and lower horizontal members 38 and 39 joined at their ends by vertical members 40 and 41. Upper member 38 is received in a sliding fit in a horizontal sleeve 42 fixed on a horizontal frame plate 43. A piston-and-cylinder 45 fixed by a plate 46 to frame plate 43 is operatively connected to member 40 of suspension unit 34 to reciprocate the suspension unit in a horizontal plane thereby effecting forward and rearward movement of the fingers 11.

A finger lifting bar 55 is mounted for vertical movement by piston-and cylinder 61 on spaced vertical guide rods 57, 57' received in spaced sleeves 56, 56' fixed on the bar 55 and sleeves 58, 58' fixed on plate 43. Plate 43 is mounted by sleeves 64, 64' on laterally extending rails 65, 65' and connected by link 68 to piston-and-cylinder 66, operable to traverse the contact positioning apparatus between a contact pick-up station and a contact insertion station where the contacts are inserted into connector housings. Buffers 71 are located at each end of the traverse of the contact positioning apparatus.

Supports 69, 69' carry rails 65, 65' and are mounted in a cross-member 70.

Figure 5:
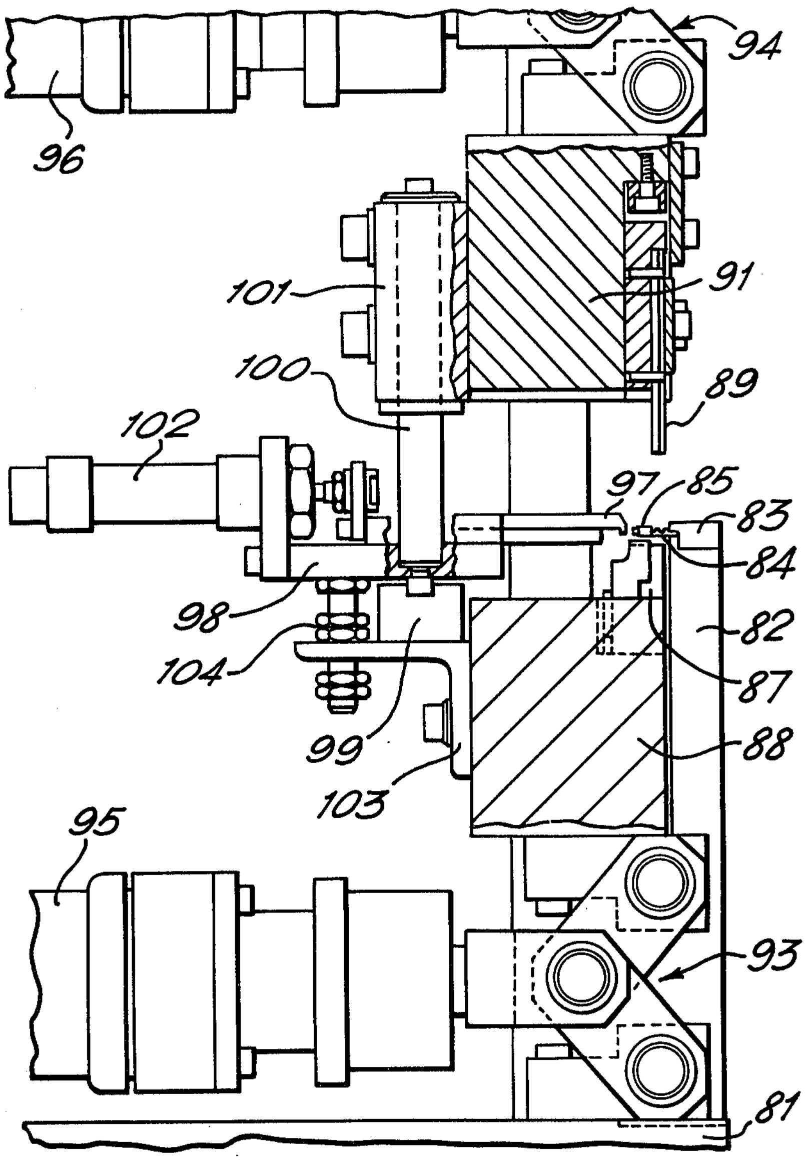
FIG. 5 is a side elevation of the apparatus parts of a wire terminating apparatus suitable for use with the contact positioning apparatus.

As shown in FIG. 5, wire terminating apparatus suitable for use with the contact positioning apparatus comprises a base 81 from which upstands a contact strip support 82 surmounted by a shear block 83 with which it defines a guide slot 84 receiving the carrier strip of a tubular contact 85. A contact support 87 is carried by a lower block 88 and a crimping die 89 is mounted for lost motion in an upper block 91. Movement of the blocks 88 and 91 together to shear a group of contacts from a carrier strip and terminate wires in respective contacts is effected through cross links 93 and 94 connected to piston-and-cylinder units 95 and 96, respectively.

A hooked contact hold-down arm 97 is connected to a piston-and-cylinder unit 102 operable to effect horizontal reciprocal movement. The piston-and-cylinder 102 is mounted on a carrier plate 98 which is connected to a piston-and-cylinder unit 99 and a guide rod 100 mounted for vertical sliding movement in a sleeve 101 fixed to the rear of block 91. Piston-and-cylinder unit 99 is mounted on a flange 103 fixed to the rear of block 88. Adjustment screws 104 are also mounted on flange 103 to adjust the height of the hold-down cam 97.

In operation of the apparatus, groups of contacts 85 (FIG. 5) having tubular pin-receiving portions and crimping ferrules are fed in strip form at a first pitch into guide slot 84. Piston-and-cylinder units 99 and 102 are then operated to raise and advance the hold-down arm over the contacts. Piston-and-cylinder unit 99 is then operated to lower the hold-down arm 97 so that the hooked end engages and steadies the contacts. Piston-and-cylinder units 95 and 96 are then operated to move the blocks 88 and 91 together, contact support 87 co-operating with shear block 83 to sever the contacts from the carrier strip and to crimp the ferrules around suitably located wires. Piston-and-cylinder units 95 and 96 are then operated to withdraw the crimping die 89 and the contact support 87.

Piston-and-cylinder units 45 and 35 are then operated to lower and advance the fingers 11, as shown in FIG. 1, (in coplanar relation) into respective tubular portions of the contacts 85 and subsequently to raise and move the fingers rearwardly to the position shown in broken lines in FIG. 1 in which the lugs 23, 23′ are aligned with the lifting bar 55. Piston-and-cylinder unit 61 is then operated to raise the plate 55 bringing the lugs 23, 23′ into alignment and the pinions 16, 16′ into engagement with the rack 27. Operation of the piston-and-cylinder unit 29 then moves the rack from the position shown in FIG. 3 to the position shown in FIG. 4 rotating the cranks and fingers through substantially 90°. As the larger cranks are rotated towards the smaller cranks the fingers and the contacts are moved more closely together. Piston-and-cylinder 66 is then operated to traverse the carriage along rails 65, 65′ to a contact insertion station where the more closely spaced contacts have the same pitch as the contacts of housings into which they can be directly inserted.

It will be appreciated that the contact positioning apparatus may, if required, be mounted on a rotating table of conventional construction to effect arcuate movement of the contact groups between terminating and contact insertion stations.

What is claimed is:

1. Contact positioning apparatus adapted to receive a plurality of contacts arranged at a first pitch and to deliver the contacts arranged at a second, different pitch characterised by a plurality of contact holding portions (11, 11′) mounted in a carriage (19) for individual rotation about different radii (13, 13′) from a contact receiving portion in which they are spaced at the first pitch and a contact delivering position in which they are spaced at the second pitch, the contact holding portions (11, 11′) extending perpendicularly from first ends of respective arms (13, 13′) and being mounted in aligned coplanar relation, the arms (13, 13′) being of progressively increased length and arranged in parallel relation, second ends of the arms (13, 13′) being mounted for rotation about parallel axes (14, 14′) perpendicular to the arms (13, 13′) which are staggered axially.

2. Contact positioning apparatus as claimed in claim 1, in which the second ends of the arms are mounted on respective shafts having respective pinions spaced, when in the contact receiving condition, by successively decreasing distances from a rack common to the pinions means being provided to move the pinions to bring all of the pinions into engagement with the rack and the rack being movable transversely of the parallel axes to drive the pinions and rotate the arms about the axes.

3. Contact positioning apparatus as claimed in claim 2 characterised in that the carriage (19) is supported by an X, Y, Z positioning mechanism (35, 45, 102, 102).

* * * * *